United States Patent Office 3,291,724
Patented Dec. 13, 1966

3,291,724
PROCESS FOR TREATING PETROLEUM
CRUDE OIL
William K. T. Gleim, Island Lake, Ill., assignor to Universal Oil Products Company, Des Plaines, Ill., a corporation of Delaware
No Drawing. Filed Apr. 29, 1964, Ser. No. 363,640
5 Claims. (Cl. 208—309)

The invention described herein is adaptable to the treating of severely contaminated heavy hydrocarbon fractions, mixtures and/or distillates. More particularly, the present invention is directed toward a method for removing high-boiling asphaltenic material from petroleum crude oils and topped or reduced crude oils. Through the utilization of the present invention, a heavy hydrocarbon charge stock is made more suitable for use in a catalytic hydrorefining process for the purpose of effecting substantially complete removal of various types of impurities including nitrogenous and sulfurous compounds, and organo-metallic contaminants.

Petroleum crude oils, and topped or reduced crude oils as well as other heavy hydrocarbon fractions and/or distillates, particularly including vacuum tower bottoms, atmospheric tower bottoms, black oils, heavy cycle stocks, visbreaker product effluent, etc., are contaminated through the inclusion of excessive concentrations of various non-metallic and metallic impurities, the presence of which detrimentally affects various processes to which such heavy hydrocarbon mixtures may be subjected. Among these non-metallic impurities are nitrogen, sulfur and oxygen which usually exist as heteroatomic compounds, and effectively poison various catalytic composites which may be employed in a process for the conversion of such petroleum fractions. Nitrogenous and sulfurous compounds are also objectionable because combustion of fuels containing these impurities results in the release of nitrogen and sulfur oxides which are noxious, corrosive and present, therefore, a serious problem with respect to pollution of the atmosphere. Of the metallic contaminants, those containing nickel and vanadium are most common, although other metals including iron, copper, lead, zinc, etc., are often present. These metallic contaminants are generally found to exist within the crude oil as organo-metallic compounds of relatively high molecular weight, such as metallic porphyrins and the various derivatives thereof. At least a portion of the organo-metallic complexes appear to be linked with high molecular weight asphaltenic material and become concentrated in the residual fraction during an initial distillation. A reduction in the concentration of the organo-metallic compounds is not as easily achieved as a reduction in the concentration of the non-metallic compounds and to the extent that the crude oil, reduced or topped crude oil becomes suitable for further processing.

In addition to the foregoing described contaminating influences, crude oil and other heavy hydrocarbonaceous material contain high molecular weight asphaltenic compounds. These are non-distillable, oil-insoluble coke precursors which contain sulfur, nitrogen, oxygen and various metals. Generally the asphaltenic material is colloidally dispersed within the crude oil and, when subjected to heat, as in a vacuum distillation or atmospheric distillation process, has the tendency to flocculate, polymerize and thermally crack, whereby the conversion thereof to more valuable oil-soluble products becomes extremely difficult. With respect to a process for hydrorefining, or treating of hydrocarbon fractions and/or distillates, the presence of large quantities of organo-metallic compounds, and particularly high molecular weight asphaltenic material, interferes considerably with the activity of the catalyst in regard to the destructive removal of the non-metallic compounds, which function is normally the easiest for the catalyst to perform to an acceptable degree. Therefore, it is highly desirable to produce a hydrocarbon mixture substantially free from the coke-forming asphaltenic material, and organo-metallic compounds, which mixture is substantially reduced with respect to nitrogen and sulfur concentration.

The necessity for effecting the removal of the foregoing contaminating influences is well known to those possessing skill within the art of the various pertoleum refining processes. Heretofore in the field of catalytic hydrorefining, two principal approaches have been advanced; liquid-phase hydrogenation and vapor-phase hydrocracking; these processes are relatively ineffective with respect to oil-insoluble asphaltenes which are colloidally dispersed within the charge stock. Consequently, the probability of effecting simultaneous contact between catalyst particles and asphaltenic material is remote. Furthermore, since the hydrogenation and/or hydrocracking reaction zones are maintained at elevated temperature, the retention of unconverted asphaltenes, suspended in a free liquid phase oil for an extended period of time, will result in flocculation making conversion thereof substantially more difficult, and a fixed-bed process is though to be virtually precluded. The asphaltenes, being neither volatile nor dissolved in the crude, are unable to move to the catalytically active sites, the latter being obviously immovable. On the other hand, vapor-phase hydrocracking is carried out either with a fixed-bed or expanded-bed system at temperatures substantially above about 950° F.; this is not entirely well-suited to treating crude and heavy hydrocarbon fractions due to the high production of coke and carbonaceous material resulting from the presence of high molecular weight asphaltenic material, with the result that the catalytic composite succumbs to relatively rapid deactivation.

The object of the present invention is to provide a method for the economic removal of asphaltenic material from a variety of heavy hydrocarbonaceous charge stocks. The present invention makes possible the subsequent utilization of a fixed-bed hydrorefining process, which, as hereinbefore set forth, has not been considered feasible due to the excessive deposition of coke and other gummy carbonaceous material.

A wide variety of heavy hydrocarbon fractions and/or distillates may be treated, or made suitable for further processing, through the utilization of the method encompassed by the present invention. Such heavy hydrocarbon fractions include full boiling range crude oils, topped or reduced crude oils, atmospheric distillates, vacuum tower bottoms, visbreaker bottoms product, and heavy cycle stocks from thermally or catalytically-cracked charge stocks, etc. The present method is particularly well adaptable to the treating of crude oils and topped or reduced crude oils containing large quantities of asphaltenic material, and is especially advantageous when applied to the treating of atmospheric or vacuum tower bottoms, since the asphaltenic material in such charge stocks has become agglomerated to a certain extent by reason of the reboil temperature of fractionation, and is, therefore, significantly more resistant to conversion. For example, a Wyoming sour crude oil, having a gravity of 23.2° API at 60° F., is highly contaminated by the presence of 2.8% by weight of sulfur, 2,700 p.p.m. of total nitrogen, approximately 100 p.p.m. of metallic complexes, computed as elemental metals, and contains a high-boiling asphaltenic fraction in an amount of about 8.4% by weight. Similarly, and a much more difficult charge stock to convert into useful liquid hydrocarbons, a crude tower bottoms product having a gravity, °API at 60° F., of 14.3, is contaminated by the presence of 3.0% by weight of sulfur, 3,830 p.p.m. of total nitrogen, 105 p.p.m. of total metals and about 11.0% by weight of asphaltenic compounds. Asphaltenic material is a high molecular weight hydrocarbon mixture having the tendency to become immediately deposited within the reaction zone and other process equipment, and onto the catalytic composite in the form of a gummy, high molecular weight residue, whereby the catalytically active centers and surfaces of the catalyst are effectively shielded from the material being processed. Furthermore, as hereinbefore stated, the presence of excessive quantities of asphaltenes appears to inhibit the activity of the catalyst with respect to the destructive removal of sulfurous and nitrogenous compounds. Thus, the primary object of the present invention is to effect the removal of asphaltenic material from a hydrocarbon charge stock, and particularly from crude oil and/or topped or reduced crude oils which are intended to be used as charge stocks in hydrorefining and/or hydrocracking processes.

In a broad embodiment, the present invention relates to a method for removing asphaltenic material from a hydrocarbon charge stock, which method comprises treating said charge stock with a sulfurous compound selected from the group consisting of sulfur monochloride, sulfur dichloride and a mixture thereof.

Another broad embodiment of the present invention encompasses a method for removing asphaltenic materials from a hydrocarbon charge stock, which method comprises treating said charge stock with a solution from about 0.1% to about 25.0% by weight of a sulfurous compound selected from the group consisting of sulfur monochloride, sulfur dichloride and a mixture thereof, at a temperature below about 450° C.

A specific embodiment of the present invention affords a method for removing asphaltenic material from a petroleum crude oil, which method comprises treating said crude oil at a temperature of from 100° C. to about 450° C., and under a superatmospheric pressure of hydrogen within the range of from about 100 to about 300 atmospheres, with a solution of a sulfur monochloride in an amount of from 0.1% to about 25.0% by weight, separating the resulting coke and recovering said crude oil reduced in asphaltenic concentration.

From the foregoing embodiments, it will be noted that the present invention encompasses a method for decreasing the concentration of asphaltenic material in a petroleum crude oil. I have found that from about 10.0% to about 20.0% by weight of the total asphaltenic material present in a crude oil, and the heavier hydrocarbon fractions derived therefrom, is significantly more resistant to conversion, and causes an inordinately large proportion of the difficulties experienced when the crude oil is subjected to hydrorefining and/or hydrocracking. This proportion of the asphaltenic material is that which possesses the tendency to become virtually immediately transformed into coke and gummy polymerization products, as a result of which the remaining portion of the asphaltenic material fails to come into contact with catalytically active sites, thereby also becoming increasingly more difficult to convert, and is more readily transformed into coke and carbonaceous material. It is, therefore, expedient and economical to remove at least about 20.0% by weight (in the greater number of instances, more than 20.0%) of the total asphaltenic material contained in the hydrocarbon charge stock. In a few situations, dependent upon the physical and/or chemical characteristics of the charge stock, it may be necessary to remove only about 10.0% of such asphaltenic material. As previously stated, as a result of the reboil temperature of fractionation, the asphaltenic material has become agglomerated, thereby significantly increasing the difficulty with which it is converted into more valuable liquid product. Therefore, in accordance with the method of the present invention, somewhat more asphaltenic material is removed from atmospheric and vacuum tower bottoms, than is removed from a full boiling range crude oil.

The method of the present invention, for the removal of asphaltenic material from a hydrocarbon charge stock, is effected by converting the asphaltenic material into insoluble coke; however, in the absence of a catalytic composite. Such conversion of the asphaltenic material may be readily effected at a relatively low temperature within the range of from about 250° C. to about 450° C., through the use of sulfur monochloride, sulfur dichloride, or a mixture thereof. The sulfurous chloride is generally employed in an amount of from about 0.1% to about 25.0% by weight of the total quantity of hydrocarbon charge stock to be treated. An unexpected advantage is afforded, through the use of the stated sulfur chlorides, in that, at lower temperatures of from about 100° C. to about 300° C., the organo-metallic complexes are attacked, and may be removed by the rather simple expedient of caustic washing the treated liquid product. The present method does, therefore, lend itself to a multiple-stage treating process wherein the metallic contaminants are initially removed at a temperature of 100° C. to 300° C., and the asphaltenes subsequently converted to coke at a temperature of 250° C. to about 450° C. On the other hand, the entire operation may be conducted at a temperature of 300° C. to about 400° C., the insoluble coke being separated, followed by caustic washing of the treated liquid. Temperatures above about 450° C. are generally avoided in order to decrease (or entirely eliminate) the degree of initial cracking and subsequent flocculation or polymerization of the remaining asphaltenic material, as well as the high-molecular weight olefinic hydrocarbons. The treating process is effected under an imposed pressure within the range of about 100 to about 300 atmospheres, and in the presence of hydrogen in an amount such that the partial pressure thereof is within the aforesaid range.

The thus treated hydrocarbon charge stock is contacted with a caustic solution of about 2.0% to about 20.0% by weight of an alkalinous material from the group including sodium hydroxide, potassium hydroxide, sodium carbonate, etc. to remove the metallic contaminates.

Through the utilization of the present invention the concentration of asphaltenic material, for example in a vacuum tower bottoms, will be decreased from about 12.0% to about 2.0% by weight, and in many instances, to less than about 2.0% by weight. With respect to a full boiling range crude oil, from about 8.4% to about 1.0% by weight, or less. The asphaltenic material which remain in the crude oil, or atmospheric tower bottoms, is more readily converted by subsequent hydrorefining and/or hydrocracking processes into valuable pentane-soluble hydrocarbon product, without incurring the virtually immediate depositon of coke and carbonaceous material which otherwise leads to rapid catalyst deactivation. Thus, a subsequent hydrorefining process may be conducted for an extended period of time before the catalytic composite employed must necessarily be regenerated, or replaced as a result of the natural deterioration of the catalytically active metallic components.

Briefly, the method of conducting the present invention, as applied, for example to a vacuum tower bottoms product having a gravity, °API at 60° F., of 14.7, and containing about 12.53% by weight of asphaltenic material, is initiated, for example, by admixing the crude tower bottoms product with about 20.0% by weight of sulfur monochloride. The mixture is placed in a suitably manifolded enclosed vessel, and sufficient hydrogen is added at room temperature to insure a hydrogen pressure of 225 atmospheres at a temperature of 425° C. The contents of the vessel are heated to a level of about 425° C., and maintained under these conditions for a period of from about two to about eight hours, being agitated throughout the period in order to provide intimate contact of the contents. The resulting hydrocarbon mixture, containing converted asphaltenic material in the form of insoluble coke, is passed into a suitable settling, or centrifuge system, the supernatant liquid indicating only 1.4% by weight of pentane-insoluble asphaltenes.

The resulting hydrocarbon charge stock, reduced in asphaltenic concentration, is more readily subjected to a subsequent hydrorefining and/or hydrocracking process for the purpose of eliminating the sulfurous and nitrogenous compounds and the remainding organo-metallic complexes, and to convert the charge stock into lower-boiling hydrocarbon products. Thus, the method of the present invention lends itself to a combination process wherein the crude oil, topped or reduced crude oil, or atmospheric or vacuum tower bottoms, is initially treated for the purpose of removing the asphaltenic material exhibiting the greatest resistance to conversion into pentane-soluble hydrocarbons. The subsequent hydrorefining and/or hydrocracking process is conducted at a temperature of from about 680° F. to about 850° F., under an imposed hydrogen pressure of from about 100 to about 3,000 p.s.i.g. Hydrogen is employed in admixture with the charge stock in an amount of from about 5,000 to about 100,000 s.c.f./b.b.l. The liquid hourly space velocity, defined as volumes of hydrocarbon charge per hour per volume of catalyst disposed within the reaction zone is at least partially dependent upon the physical and chemical characteristics of the charge stock, and will be within the range of from 0.5 to about 10.0. The catalytic composite, utilized in the hydrorefining and/or hydrocracking process, is a composite of a refractory inorganic oxide carrier material and catalytically active metallic component selected from the group consisting of Groups V–B, VI–B and VIII–B of the periodic table. Thus, the catalytic composite may comprise one or more metallic components from the group of vanadium, niobium, tantalum, molybdenum, tungsten, chromium, iron, cobalt, nickel, platinum, palladium, iridium, osmium, rhodium, ruthenium, and mixtures thereof. The refractory inorganic oxide carrier material may comprise alumina, silica, zirconia, magnesia, titania, boria, strontia, hafnia, and mixtures of two or more, including silica-alumina, silica-zirconia, silica-alumina-magnesia, alumina-zirconia-silica, etc. It is understood that the composition and physical characteristics of the catalytic composite employed in the subsequent hydrorefining and/or hydrocracking processes is not limiting upon the treating method of the present invention.

The following examples are given for the purpose of illustrating the means by which the method, encompassed by the present invention, is effected. The charge stock, temperatures, pressures, reagents and concentrations are herein presented as being exemplary only, and are not intended to limit the present invention to an extent greater than that defined by the scope and spirit of the appended claims.

*Example I*

The hydrocarbon charge stock employed in this example was the vacuum tower bottoms product previously described. An initial analysis indicated that this hydrocarbon charge stock, having a gravity, °API at 60° F., of 14.7, is contaminated by 3.18% by weight of sulfur, 3,900 p.p.m. of nitrogen, 40 p.p.m. of nickel, 440 p.p.m. of vanadium, and consists of a high-boiling asphaltenic fraction in an amount of about 12.53% by weight. 214 grams of the charge stock was intimately commingled with 5.0 grams of sulfur monochloride (2.34% by weight), and placed in a rotating autoclave having a capacity of about 1,800 cc. The contents of the autoclave were pressured with sufficient hydrogen to insure a final pressure of 186 atmospheres at a final temperature of 400° C. After a period of about eight hours at a temperature of 400° C. and a pressure of 186 atmospheres, the rotating autoclave is allowed to cool to about room temperature while being de-pressured.

The total effluent from the autoclave was subjected to centrifugal separation to remove the insoluble coke, the resulting supernatant liquid being analyzed for residual asphaltenes. The liquid product effluent, having a gravity of 30.4, indicated 6.1% by weight of asphaltenes, or 51.4% removal of the asphaltenic material originally present.

209 grams of the tower bottoms were admixed with 48.0 grams of sulfur monochloride (23.0% by weight), the mixture being maintained at 425° C. and 225 atmospheres, in the autoclave for eight hours. After removal of the insoluble coke, the normally liquid hydrocarbon effluent indicated a gravity of 34.7 °API at 60° F., and only 1.4% by weight of pentane-insoluble asphaltenes, or 88.8% removal.

The hydrocarbon charge stock, now devoid of the more conversion-resistant asphaltenic material, and having a significantly higher gravity, is more readily susceptible to conversion by way of hydrorefining and/or hydrocracking reactions without incurring the virtually immediate deposition of coke and gummy hydrocarbonaceous material onto the catalytic composites employed in such processes. The economic advantages afforded as a result of the extended acceptable life of the catalytic composite will be readily recognized by those possessing skill within the art of petroleum refining processes. An additional advantage lies in the fact that the hydrocarbon charge stock may be processed at significantly less severe conditions of temperature and pressure with the inherent result that a greater yield of valuable liquid hydrocarbon product is obtained, lesser quantities of the charge stock being converted into normally gaseous light paraffinic hydrocarbons, carbon dioxide, carbon monoxide, hydrogen, etc.

*Example II*

200 grams of the Wyoming sour crude oil hereinbefore described, is admixed with 20.0 grams of sulfur dichloride (10.0% by weight), the mixture being heated in the rotating autoclave at 200 atmospheres of hydrogen and 300° C. for a period of eight hours. The product effluent is subjected to centrifugal separation to remove the resulting insoluble coke, and the supernatant liquid is countercurrently washed with a 10.0% by weight solution of sodium hydroxide. The resulting liquid hydrocarbons, indicating about 3.4% by weight of asphaltenes (down from 8.39%) and less than about 10 p.p.m. of organo-metallic compounds (calculated as elemental nickel and vanadium), in an amount of 100 grams, is admixed with 5.0 grams of sulfur dichloride in the rotating autoclave. The mixture is maintained at a temperature of 400° C. and under 200 atmospheres of hydrogen for a period of eight hours, after which the autoclave is cooled and depressured. Following centrifugal separation, to remove insoluble coke, and analysis of the normally liquid product indicates a gravity of about 30.5 °API at 60° F., and the continued presence of only 1.3% by weight of residual asphaltenes.

The foregoing examples and specification illustrate the method by which the present invention is effected, and indicates the advantages afforded a process for hydrorefining petroleum crude oils and the heavier hydrocarbon fractions derived therefrom.

I claim as my invention:

1. A method for removing asphaltenic material from a crude oil which comprises treating said crude oil at a temperature of from about 100° C. to about 450° C., and under a pressure of hydrogen within the range of from about 100 to about 300 atmospheres, with sulfur monochloride in an amount of from 0.1% to about 25.0% by weight, separating the resulting coke and recovering said crude oil reduced in asphaltenic concentration.

2. A method for removing asphaltenes from hydrocarbon oil containing the same which comprises treating the oil at a temperature of from about 100° C. to about 450° C. and under a hydrogen pressure of from about 100 to about 300 atmospheres with sulfur monochloride or sulfur dichloride or a mixture thereof to convert asphaltenes into insoluble coke, separating the coke thus formed and recovering the oil of reduced asphaltene content.

3. The method of claim 2 further characterized in that the oil is treated with sulfur monochloride.

4. The method of claim 2 further characterized in that the oil is treated with sulfur dichloride.

5. The method of claim 2 further characterized in that the oil is treated with a mixture of said chlorides.

References Cited by the Examiner

UNITED STATES PATENTS

| | | | |
|---|---|---|---|
| 413,187 | 10/1889 | Kendall | 208—241 |
| 2,114,313 | 4/1938 | Patrick | 208—241 |
| 2,114,315 | 4/1938 | Patrick | 208—241 |

OTHER REFERENCES

McAfee, "Petroleum Processing" vol. 11, No. 4, April 1956, pages 47–52.

DELBERT E. GANTZ, *Primary Examiner.*

HERBERT LEVINE, *Assistant Examiner.*